J. H. CONNELL.
Water-Engines.
No. 133,356.
Patented Nov. 26, 1872.
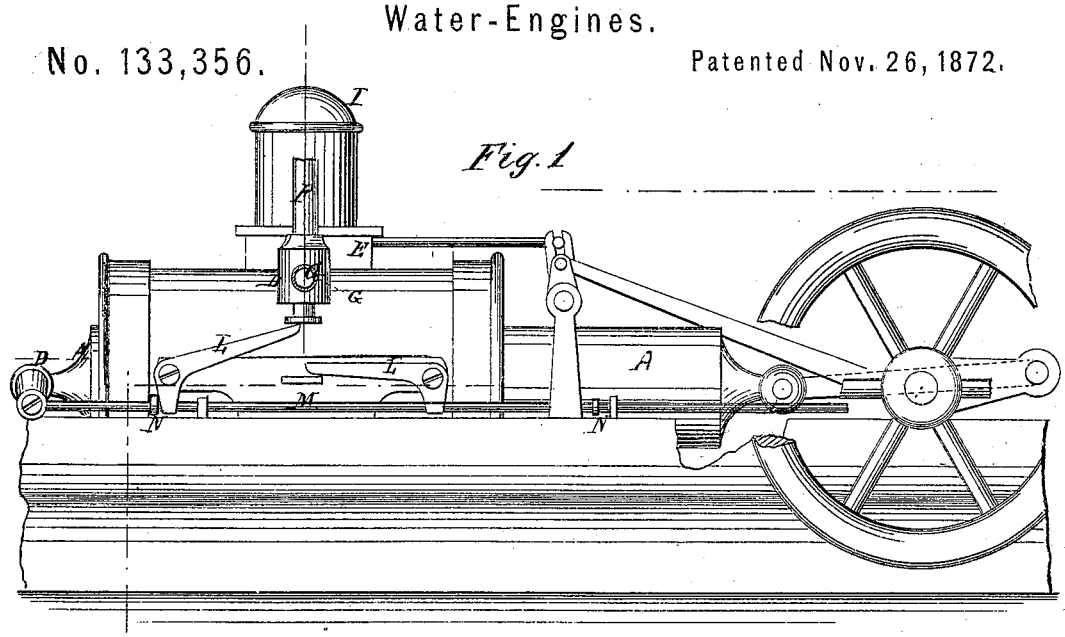
*Fig. 1*
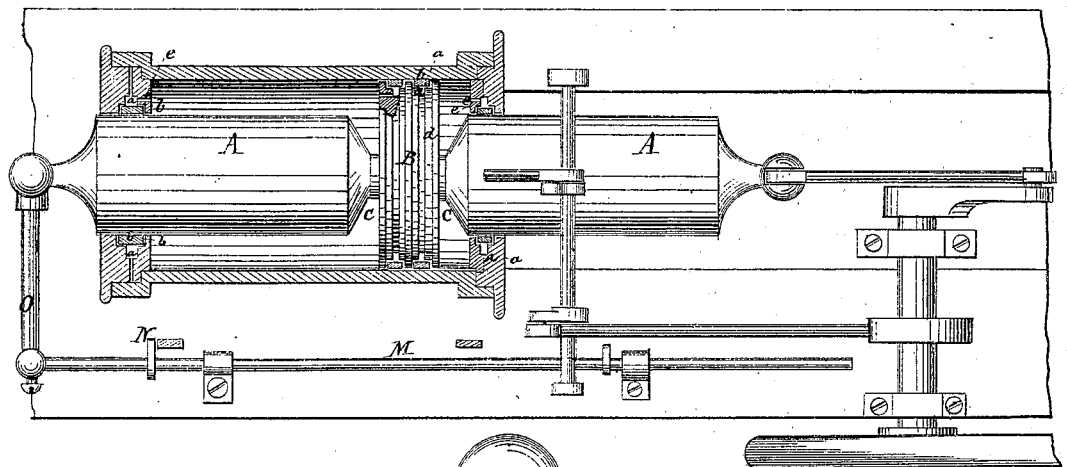
*Fig. 2*
*Fig. 3*
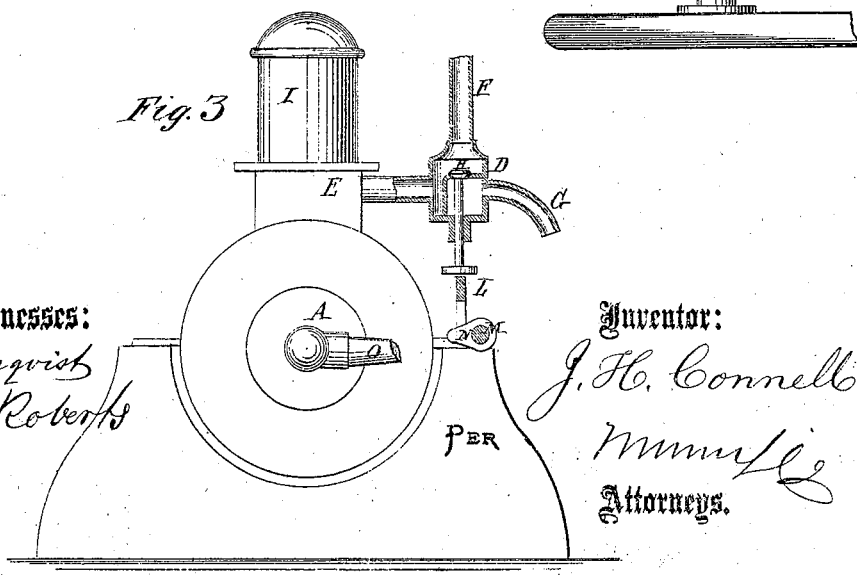
Witnesses:
A. W. Almqvist
Alex F. Roberts
Inventor:
J. H. Connell
per
Attorneys.

UNITED STATES PATENT OFFICE.

JAMES H. CONNELL, OF ELIZABETH, NEW JERSEY.

IMPROVEMENT IN WATER-ENGINES.

Specification forming part of Letters Patent No. 133,356, dated November 26, 1872.

*To all whom it may concern:*

Be it known that I, JAMES H. CONNELL, of Elizabeth, in the county of Union and State of New Jersey, have invented a new and Improved Water-Engine, of which the following is a specification:

My invention consists of an arrangement of the piston-rod for filling up the space in the cylinder to economize water. It also consists of an arrangement of the piston and piston-rod packing to simplify the cost of construction and utilize the water pressure for packing. It also consists of a combination of a valve and pipe connection with the valve-chest, whereby the flow of water may be directed through it while the crank is passing the dead-centers, so that the shocks common to the ordinary engines by the sudden stoppage of the water-column will be avoided; and it also consists of the combination of an air-chamber with the valve-chest of a water-engine; also, with this escape-valve for neutralizing these shocks more completely than can be done with either alone, all as hereinafter described.

Figure 1 is a side elevation of my improved water-engine. Fig. 2 is a horizontal section, and Fig. 3 is partly an end elevation and partly a transverse section.

Similar letters of reference indicate corresponding parts.

I propose to extend the piston-rod A through the engine at both ends and enlarge it a little distance from the piston, so as to economize the water-space and retain the same area on the piston for pressure, making a deep groove, C, in the rod each side of the piston, which groove I prefer to make in the form of a right-angled triangle; but any other form will do. For packing the piston, also the piston-rod, I propose to have a small annular groove, *a*, behind the packing *b* in the bottom of the groove *d*, to which I admit the water through small holes *e* to force the packing out. The piston will have two packing-grooves, *d*, each with its holes *e* entering it from the side to which it belongs, so that valves will not have to be provided to prevent the water from flowing through, as when only one groove is used with holes *e* leading to it from both sides. My packing arrangement differs from those in which steam is admitted behind the packing, in having the secondary groove *a* for the water to flow around readily, which is necessary for water-engines, but not for steam. D represents a secondary valve-chest in the supply-pipe leading into the principal valve-chest, to which I attach a waste-pipe, G, and in which I arrange a valve, H, with which I have suitable contrivances to lift it each time the crank is passing the dead-centers, and let a small quantity of water escape, so that the flow of the water will not be arrested, as in ordinary engines, and shock and strain the engine, which is very objectionable in quick-running engines with great pressure. I is an air-cushion chamber, which I propose to attach to the principal valve-chamber also for neutralizing these shocks, which, together with the above-described escape-valve, I find to be very efficient, enabling me to run my engine at a very high rate of speed. In this example I have represented weighted elbow rock-levers L and the sliding rod M with tappets N as the means of operating this valve H, the rod M being connected to the piston-rod by the arm O, and the tappets being so adjusted that one will come against one of the levers and lift the valve just before the piston stops at either end of its movements; but any other suitable valve-operating mechanism may be used.

Having thus described my invention, I claim as new and desire to secure by Letters Patent—

1. A piston-rod, enlarged beyond the size required for the ordinary functions thereof, extended through both ends of the cylinder, and reduced to the requisite size for strength only at the connections with the piston, substantially as specified.

2. The small annular groove *a* in the bottom of the packing-grooves *d*, with the water-passages *e* communicating with it, substantially as specified.

3. The combination, with the valve-chest of a water-engine, of an air-cushion chest, I, substantially as specified.

JAMES H. CONNELL.

Witnesses:
ANSON P. THAYER,
T. B. MOSHER.